United States Patent
Cook

(10) Patent No.: US 8,059,675 B1
(45) Date of Patent: *Nov. 15, 2011

(54) APPLICATION PING

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1072 days.

This patent is subject to a terminal disclaimer.

(21) Appl. No.: 10/827,730

(22) Filed: Apr. 20, 2004

Related U.S. Application Data

(63) Continuation-in-part of application No. 10/606,918, filed on Jun. 26, 2003.

(51) Int. Cl.
*H04J 3/22* (2006.01)
*H04J 3/00* (2006.01)
*H04J 3/16* (2006.01)
*G06F 15/173* (2006.01)

(52) U.S. Cl. ......... 370/464; 370/468; 709/225; 709/238

(58) Field of Classification Search ............... 370/464, 370/465, 468
See application file for complete search history.

(56) References Cited

U.S. PATENT DOCUMENTS

| | | | |
|---|---|---|---|
| 5,691,979 A | 11/1997 | Cadd et al. | |
| 5,701,465 A | 12/1997 | Baugher et al. | |
| 5,764,920 A | 6/1998 | Cook et al. | |
| 5,915,095 A | 6/1999 | Miskowiec | |
| 6,047,330 A | 4/2000 | Stracke, Jr. | |
| 6,122,630 A | 9/2000 | Strickler et al. | |
| 6,353,616 B1 | 3/2002 | Elwalid et al. | |
| 6,463,471 B1 | 10/2002 | Dreke et al. | |
| 6,522,733 B1 | 2/2003 | Cook | |
| 6,560,648 B1 | 5/2003 | Dunn et al. | |
| 6,870,827 B1 * | 3/2005 | Voit et al. | 370/352 |
| 7,069,337 B2 * | 6/2006 | Rawlins et al. | 709/238 |
| 7,299,294 B1 * | 11/2007 | Bruck et al. | 709/235 |
| 2003/0112749 A1 * | 6/2003 | Hassink et al. | 370/225 |
| 2006/0013203 A1 * | 1/2006 | Benedyk et al. | 370/352 |

* cited by examiner

*Primary Examiner* — Chirag Shah
*Assistant Examiner* — Srinivasa Reddivalam

(57) ABSTRACT

Network transport management methods and tools are used to provide compositional service assembly and management such that processing (i.e., computing) capacity is handled in a manner analogous to handling transport quality of service. The memory, speed of operations, and input/output rates of a resource component are viewed as an aggregate bandwidth of transport. The distributed functional components of a compositional application/service are adapted to receive and process resource allocation requests. This allows the same network protocols and tools as are used for transport management to be used from a centrally located resource aggregator for composing (i.e., assembling) and allocating (i.e., assigning) computing resources with a guaranteed delivery rate. Additionally, a test message can be sent through the compositional service assembly to confirm connectivity and functionality of individual assembly components.

19 Claims, 9 Drawing Sheets

APPLICATION PING

CROSS REFERENCE TO RELATED APPLICATIONS

This application is a continuation-in-part of pending U.S. patent application Ser. No. 10/606,918 filed Jun. 26, 2003.

BACKGROUND OF INVENTION

This invention relates in general to allocation and operation of data processing resources within a digital network and in particular to a method for confirming the connectivity and functionality of the allocated digital network resources.

The operation of digital networks require a significant investment in infrastructure; yet competitive pressures and the fast pace of technological change result in low profit margins. Naturally, network providers (such as Internet service providers and backbone providers) seek to minimize their equipment cost, optimize latency, and maximize scalability, robustness, and maintainability of their networks. Network architectures directed toward satisfying these goals often cause a tradeoff in network flexibility, such as the ability to reconfigure resources to provide different services.

For instance, it may be cost effective to employ a network architecture in which data processing resources are distributed in separate remote locations with several units of one type of processing component at one location (i.e., network node) and several units of another type of processing component at another node. Those processing resources may be used to generate standalone services. For instance, a group of Class 4 call processing resources may be at one location, and a group of Service Control Point (SCP) processing resource may be at another. A compositional service is one that is generated from, or composed of, standalone services. Advanced Intelligent Network (AIN) telephony services are an example of compositional services generated by combining the previously mentioned call processing and service control point processing services. Another such service is the delivery of audiovisual content (e.g., videoconferencing or streaming of movies) to an end user. Various component services will be necessary to provide the complete compositional service, such as data storage services, media conversion services, authentication/authorization services, and billing services.

Typically, physical processing components for performing the functions of a compositional service have been manually configured to construct the service. The capacities of the processing components dedicated to the composed service have been based on the expected usage of the service and balanced against the demands generated by other components at expected usage levels. To guarantee a certain performance level, usually denoted as quality of service or QoS, at times of peak usage, a capacity level would have to be built into the services which is then unused at off-peak times, which is usually a majority of the time. To avoid excessive cost, a service usually is provided with enough capacity to handle typical loads but less capacity than would be required to handle peaks loads without degradation. Thus, a component dedicated to one service may be unused or underutilized during a time that another service is congested because of a lack of capacity of that same type of component. In other words, a component of a type "X" included in a composed group of components for a service of a type "A" may be unused because of low usage of service "A" while a nearby component of type "X" for another service "B" is overloaded and providing a poor QoS due to peak usage of service "B".

Conventional service configuration methods have not allowed sharing or reconfiguration of such resources in a simple, cost-effective manner. For instance, heavy long distance traffic may overwhelm SCP inter-exchange services while other SCP resources that are dedicated to Local Number Portability (LNP) remain idle. Accordingly, it would be desirable to provide a system for assignment of available communication resources that provides the most efficient use of the resources. It also would be desirable to provide a means of monitoring the performance of the selected resources and reallocating the resources as necessary.

SUMMARY OF INVENTION

The present invention provides a method for confirming the connectivity and functionality of data processing resources within a digital network.

Briefly, the invention provides a mechanism for managing processing (i.e., computing) capacity in a manner analogous to managing transport quality of service. The memory, speed of operations, and input/output rates of a resource component are viewed as an aggregate bandwidth of transport—in essence, establishing a sustainable data flow rate analogous to the sustainable data flow rate indicated by a bandwidth measure in transport. The distributed functional components of a compositional application/service are adapted to receive and process resource allocation requests. This allows the same network protocols and tools as are used for transport management to be used for composing (i.e., assembling) and allocating (i.e., assigning) computing resources with a guaranteed delivery rate.

A compositional service is advertised by some method, such as UDDI or Web Pop-up. The compositional service is composed of a plurality of functional components by a central resource aggregator. Each component may be managed as a functional instance, as a service component, as a component type, or as a member of a set of components connected by identified transport links.

In one aspect of the invention, a method is provided for managing computer processing resources connected within a network. A plurality of physical processing components are interconnected within the network for providing a plurality of virtual processing elements that are accessible by respective network traffic paths. A resource aggregator represents a pool of the virtual processing elements, each virtual processing element having a capacity allocable according to a respective communication transfer rate. A reservation request is received for utilizing specified processing resources. The resource aggregator identifies at least one virtual processing element for providing capacity to satisfy the reservation request in response to the respective communication transfer rate. Use of a respective network traffic path is allocated to service the reservation request in response to the identified virtual processing element.

Once a traffic path is established, A test message is processed through the virtual processing elements to confirm the connectivity and functionality of the elements. Subsequent test messages are processed during the operation with resources being reallocated if degradation of service exceeds set parameters.

Various objects and advantages of this invention will become apparent to those skilled in the art from the following detailed description of the preferred embodiment, when read in light of the accompanying drawings.

DETAILED DESCRIPTION

Figure 1:
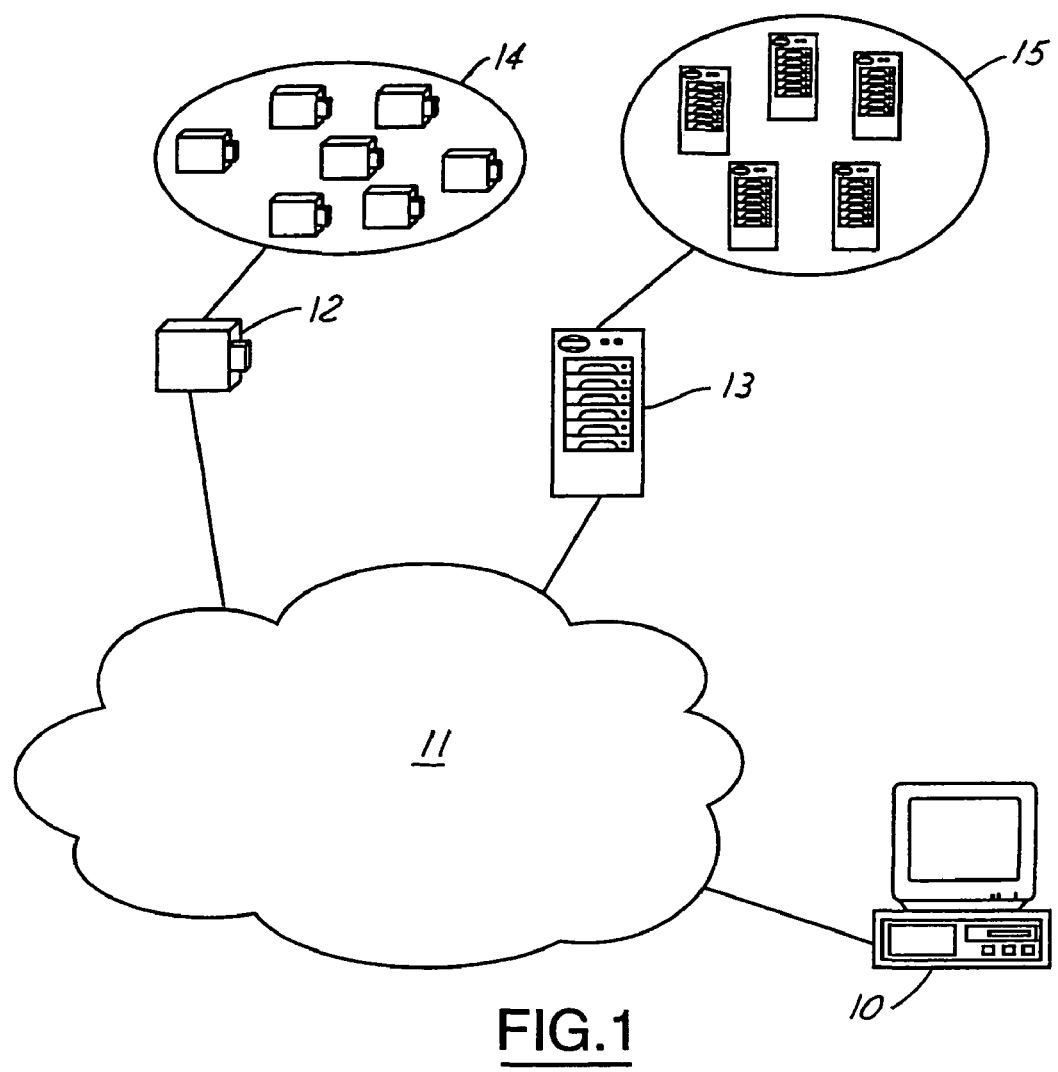
FIG. 1 is a block diagram showing the generation of virtual components within physical components interconnected according to the present invention.

Referring to FIG. 1, a user 10 is connected to a network 11 for accessing functional services composed of physical processing components 12 and/or 13. In order to manage the resources available from components 12 and 13, the processing capacities of the components 12 and 13 are divided into pluralities of virtual processing elements 14 and 15, respectively. Each virtual processing element is capable of performing a respective processing operation and has a respective amount of capacity which is preferably measured in terms of an equivalent communication transfer rate based on the speed at which complete data processing transactions (i.e., from input of data to a corresponding output of data) are accomplished (preferably measured in bytes per second). Each of these virtual processing elements are separately allocable and made accessible by respective network traffic paths. The paths to virtual processing elements residing on the same physical device may be comprised of the same transport media but may be separately identified according to respective port assignments or packet labeling, for example. Applications being provided by the physical components are preferably multi-threaded so that a resource can be shared by multiple users under the management of an associated aggregator. Otherwise, the full capacity of a component may have to be allocated in its entirety to service a single request. For example, if a transcoder component translates from G.711 encoded format to G.729 encoded format at 64 kbps, the component could be registered in the resource pool as a 64 kbps "G.711/G.729 transcoder link". However, because this component is receiving data in a G.711 form, it is actually present in a "G.711 form domain", which is the logical location of all G.711 encoded data and is managed by a first aggregator. Likewise, since the component is transmitting data in a G.729 form, the other end of this logical link is present in the "G.729 form domain", which is managed by a second aggregator. All of the resources of the first and second aggregators represent capacity that would appear as port capacity on a physical router. Accordingly, the first aggregator uses the component as a logical link that could be considered as representing available capacity on a port that is connected to the second aggregator that represents the G.729 form domain.

Network 11 may be comprised of an Internet Protocol (IP) network, an Asynchronous Transfer Mode (ATM) network, or other type of digital network. It may further comprise an inter-network such as the Internet.

Figure 2:
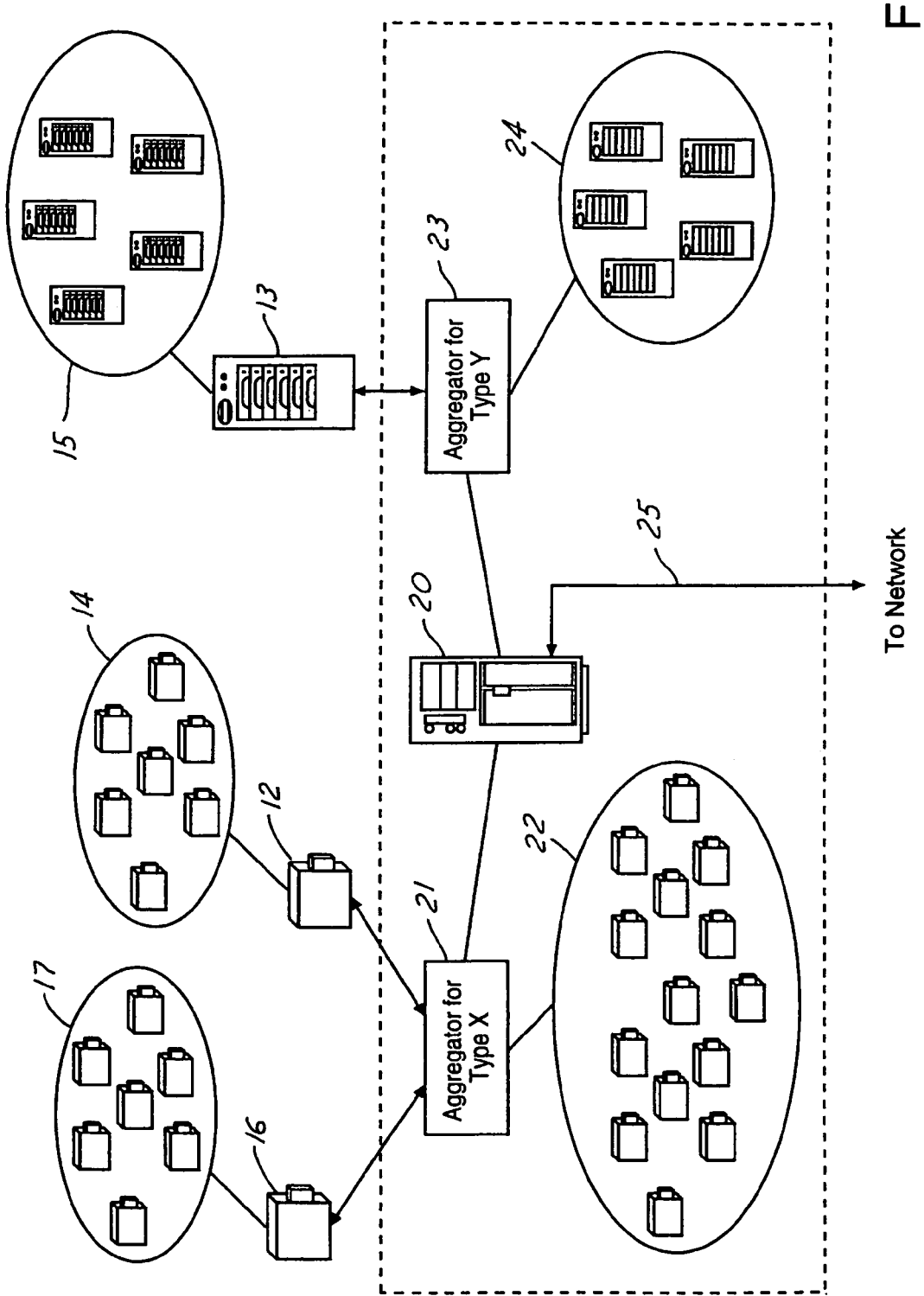
FIG. 2 is a block diagram of a resource aggregator interconnected with multiple component types in one preferred embodiment of the invention.

Upon being connected to network 11, physical components 12 and 13 advertise the virtual processing elements that it can produce, i.e., the physical components automatically send messages to announce their capacity to other devices within the network. The invention also contemplates that a process running on a general purpose computer can recognize the device connection, and proxy the capabilities for the device to the network, in which case the process can perform the advertisement and any necessary negotiation. As shown in FIG. 2, the advertisements are directed to a resource aggregator 20 which may preferably be an application program executing on a specified server connected to network 11. The advertisements are provided according to predetermined component types, such as a storage type, a media conversion type, or an authentication/authorization type, for example. There may be a separate aggregator process 21 for a component type "X" that represents the available type "X" virtual processing components within a type "X" pool 22. Another physical component 16 also advertising virtual processing elements 17 of type "X" are also included in pool 22 for allocation by aggregator 20. Similarly, a separate aggregator process 23 for a component type "Y" represents the available type "Y" virtual processing components within a type "Y" pool 24.

Aggregator 20 includes network links such as a link 25 for communicating with additional physical processing components advertising virtual processing elements, with system administrative resources, and with end users, for example. Based on the pooled resources, aggregator 20 advertises the virtual processing elements to potential users of the resources within the network. Reservation requests seeking use of the virtual processing elements may be received via link 25.

When a new physical component is added to the network, its capacity is automatically added to a corresponding pool as new virtual processing elements in the aggregator and becomes available for allocation in response to user reservation requests.

The virtual processing elements run independently of the type of hardware platforms they physically reside on and the type of network connectivity being employed. They are configured to operate according to predetermined specifications for each processing operation to be made available. By making each virtual processing element available as a virtual network element that can be individually addressed and reserved, integrated communication and management applications/tools can be used, especially where part of an IP network.

Figure 3:
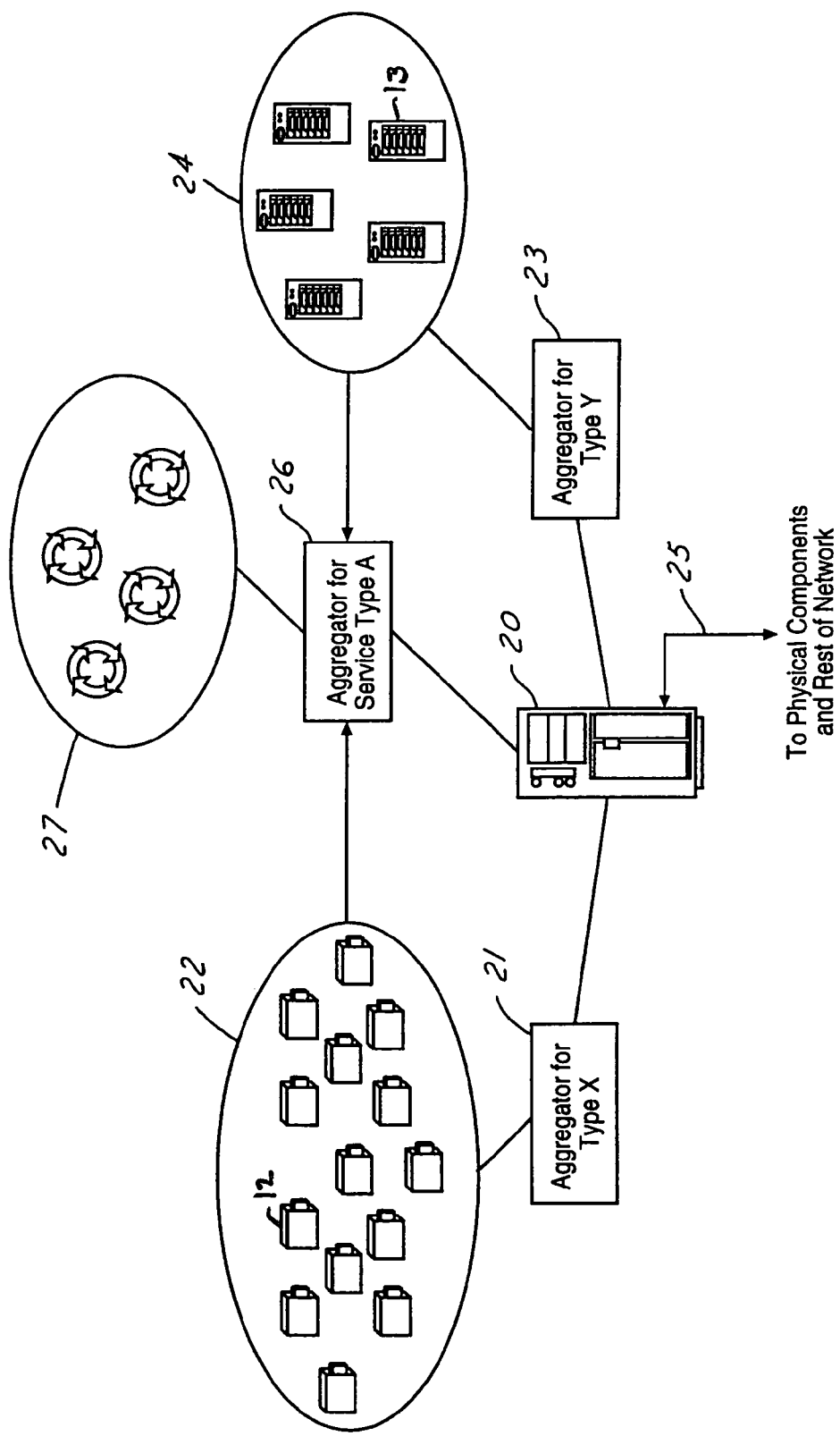
FIG. 3 is a block diagram showing aggregation of a compositional service type according to the present invention.

FIG. 3 shows a preferred embodiment for assembling complex service functions based on combining multiple component types into composite resource sets. Thus, aggregator 20 includes a process 26 for aggregating a service type "A" using virtual processing elements from pool 22 of component type "X" and pool 24 of component type "Y" along with at least one transport link for joining the virtual processing elements together and/or with a requesting user. Each instance of aggregated service type "A" comprises a composite resource set which is made available in a pool 27 of service type "A". Thus, when a "service network" is started by a network provider, an aggregation component is started for each service type that is to be made available to users. Based on the pools of virtual processing elements of different component types (i.e., processing operations), the service-type aggregation component establishes and advertises a service resource pool of available composite resource sets, each with a respective capacity that may be determined in advance or in response to specific reservation requests. Each composite resource set includes a specific set of virtual processing elements having predetermined interactions for integrating their processing operations into a particular service function, such as delivery of video content. While the composite resource set logically includes reserved transport links after allocation, the transport links will very likely not be included in the component aggregation information. The transport links will very likely be reserved with a protocol like RSVP, so that the individual router information will not necessarily be conveyed to the aggregator. Thus, after allocation, each composite resource set preferably includes reserved transport links to be used between the assigned virtual processing elements and/or between the user and the virtual processing elements.

In the preferred embodiment, compositional service resource reservation is performed by making the processing components receive and process communications bandwidth reservation protocols. The present invention contemplates that the processing components may be either an actual physical device or may be proxied by a logical device. For example, a physical disc drive may also be considered as providing at least two levels of logical abstraction/proxy logic within a laptop computer. Within the laptop, there is at least one controller that maps an abstract view of the disc resources to disc hardware, and there also is a device driver that maps an operating system level abstract view to the controller level abstract view. Thus, it is not intended that the invention be limited to only physical devices. When receiving a reservation request message, the resource aggregator first checks to see if the requested resource is available in sufficient quantity to fulfill the request. This is easily performed by considering the resource request in terms of the resources required to process data at the given bandwidth line rate. If sufficient resources are available, the aggregator allocates the necessary composite resource sets and labels the allocated resources with a request session identifier to show that they are then in use. If sufficient resources are not available, the aggregator replies to the request with a decline message. When the user no longer requires the resources, they are de-allocated and a communications reservation release message is sent to the physical processing components.

Figure 4:
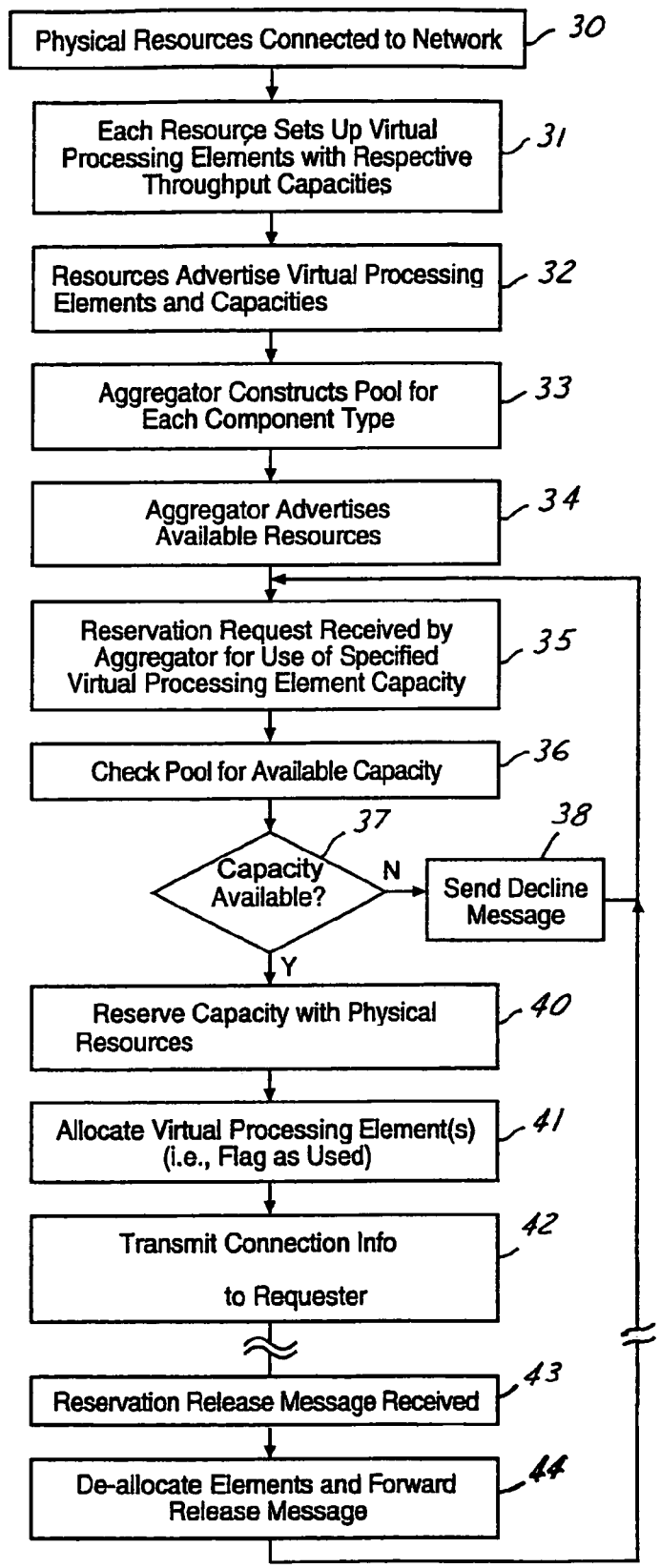
FIG. 4 is a flowchart of a preferred method for allocating virtual processing elements.

A first method of the present invention will be described in greater detail in connection with the flow chart shown in FIG. 4. In step 30, physical resources are connected to the network. Each resource sets up virtual processing elements with respective throughput capacities in step 31. In step 32, the physical resources advertise their virtual processing elements and capacities. In step 34, the aggregator advertises the available resources within its pool(s).

In step 35, a reservation request is received by the aggregator for use of specified virtual processing element capacity. The aggregator checks in step 36 to determine whether its pool contains available capacity to satisfy the request. A decision is made in step 37 whether capacity is available and can be allocated. If not, a decline message is sent in step 30 and a return is made to step 35 to wait for additional reservation requests.

If capacity is available, the necessary capacity is reserved by the aggregator in step 40. Reservations are preferably made for the virtual processing elements under control of a selected physical resource necessary for end-to-end service using the allocated virtual processing elements. In an IP network, a reservation protocol such as RSVP-TE may preferably be used. In an ATM network, resource allocation may be performed using an ATM virtual path as is known in the art. The transport links would be reserved by a conventional protocol, such as RSVP for an IP network, that the network routers receive and allocate capacity. The same RSVP message would traverse the resource aggregators which would then allocate capacity out of their resource pools similar to the manner in which the routers allocated transport capacity out of their pools. After the chosen virtual processing element(s) have been secured, the aggregator allocates the pooled resources in step 41 by setting in-use flags corresponding to the allocated resources. In step 42, the aggregator transmits connection information to the requesting user (i.e., it identifies the network traffic paths corresponding to the virtual processing elements). The connection information may, for example, include a label-switched path in an IP network corresponding to the path taken by user data through the processing operations of the virtual processing elements and to the requesting user. The user can then proceed to transmit his message over the allocated resources.

When the requesting user no longer needs the allocated resources, they preferably send a reservation release message which is received in step 43. In step 44, the aggregator de-allocates the corresponding virtual processing elements and then forwards reservation release messages to the physical components and to the transport links involved. A return is then made to step 35 to wait for additional reservation requests.

Figure 5:
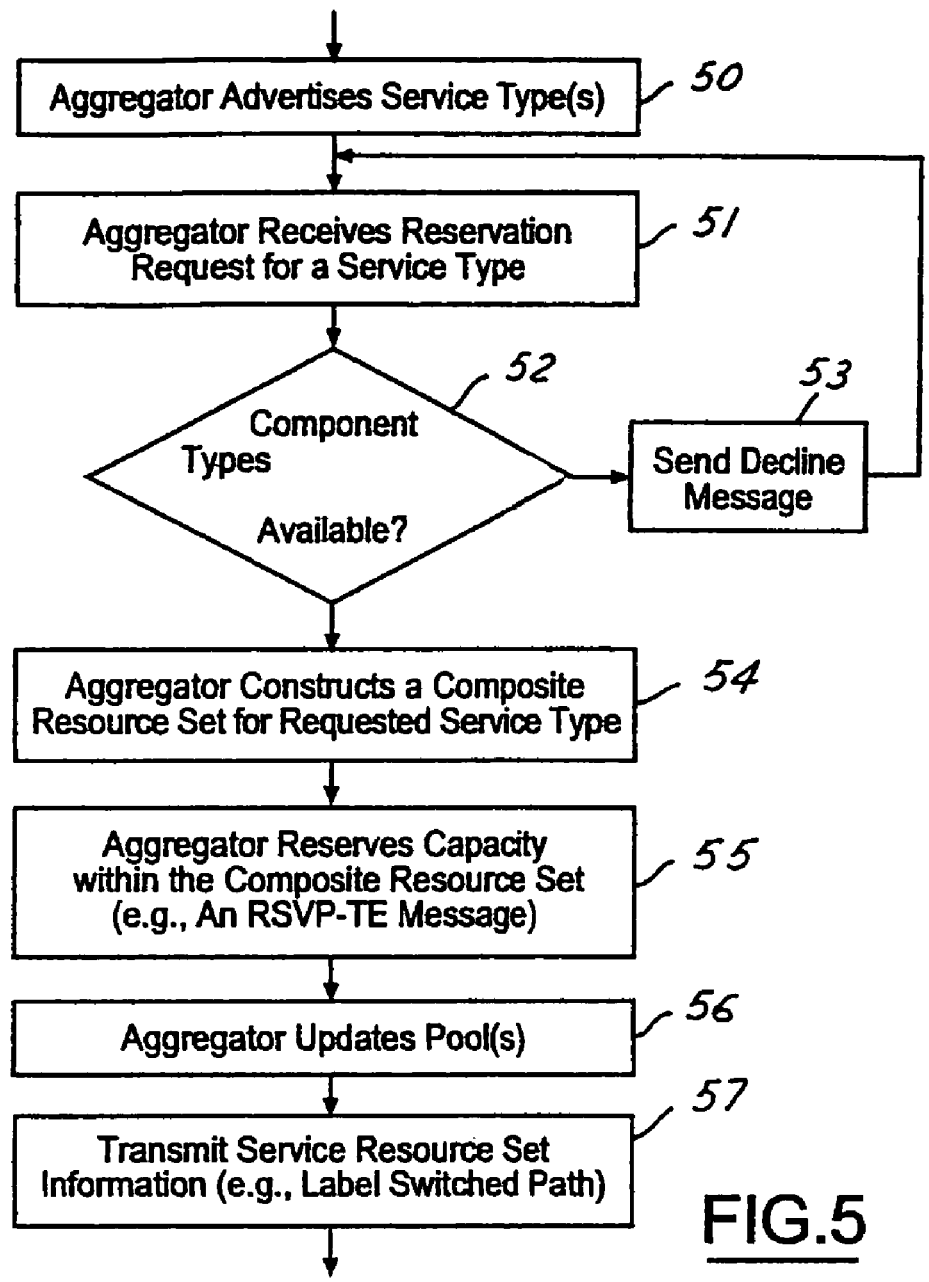
FIG. 5 is a flowchart of one preferred method of assembling a compositional service.

A further method of the invention for forming compositional services is shown in FIG. 5. After the aggregator constructs respective pools for each component type (as shown by steps 30-33 in FIG. 4), it advertises predetermined service types in step 50. In the embodiment shown in FIG. 5, resources to fulfill a reservation request are assembled on-demand. Alternatively, a predetermined amount of resources could be pre-assembled according to the service type in order to reduce response time to a reservation request.

In step 51, the aggregator receives a reservation request for a particular service type. A check is made in step 52 to determine whether the component types are available in order to satisfy the service request. If not, then a decline message is sent in step 53 and a return is made to step 51 to await further requests.

If sufficient resources are found in the corresponding pools, then the aggregator constructs a service resource set for the requested service type in step 54. In step 55, the aggregator reserves capacity within the assembled composite resource set (e.g., by sending one or more RSVP-TE messages) in order to be able to guarantee a predetermined quality of service for the requested service function. The aggregator updates the pools in step 56 by flagging the allocated resources with a request session identifier. In step 57, the aggregator transmits composite resource set information such as a label-switched path to the requesting user, who benefits from the assembled service with a guaranteed delivery rate. Once the service is no longer required, it is released as shown by steps 43 and 44 in FIG. 4.

Figure 6:
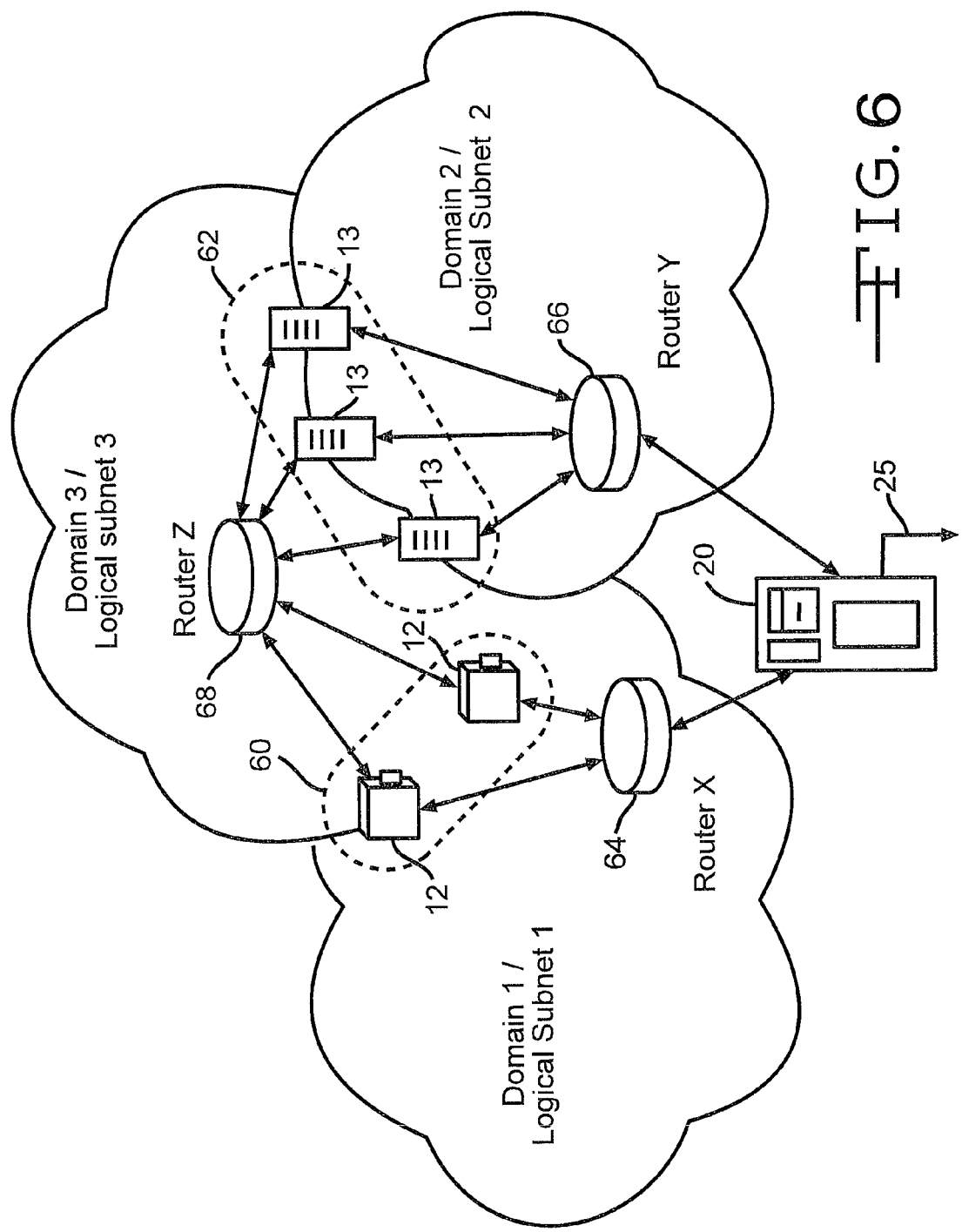
FIG. 6 is an alternate embodiment of the compositional service shown in FIG. 3.

The present invention also contemplates a method for confirming the functionality of the allocated digital resources. The method, which would be included in step 42 in FIG. 4 or in step 57 in FIG. 5, views each of the sequential processing actions as a network domain. Thus, the network illustrated by the block diagram shown in FIG. 3 may also be represented by a plurality of virtual domains, with each of the domains representing processing actions performed by physical components, as shown in FIG. 6. Components shown in FIG. 6 which are similar to components shown in the preceding figures have the same numerical identifiers. The invention considers that a physical component, or device, may perform more than one type of processing function at the same time. Thus, a device may logically represent more than one data form/encoding domain at the same time. Because the virtual processing components contained in the component pools 22 and 24 shown in FIG. 3 convert data form/encoding, they are configured as pools of linking components X and Y labeled 60 and 62, respectively, connecting the data domains. Because the individual virtual processing components are selected by an aggregator, the aggregator is considered as being analogous to a router. The aggregator is considered to be analogous to a router because a router directs the movement of data from one logical domain into another logical domain. In transport routers, the domains are generally geographically distributed, so the movement between domains requires the router to place the data on a physical port that is connected to a link that connects to the destination domain. In the service router's case, the destination domain is effectively in the same geographic location, just a different "form" or "encoding" or "time" location. The logical port and link connecting to the destination domain would have to convert the data to the destination "form", "encoding", or "time" to reach the destination domain—i.e. they would have to connect to something that performed the correct translation, just like a transport link "translates" geographical location coordinates. In FIG. 6, the router 64 corresponds to the aggregator for type X components 21 shown in FIG. 3 while the router 66 corresponds to the aggregator for type Y components 23 shown in FIG. 3. Similar to FIG. 3, the processing component pools 60 and 62 are connected through the server 20 to the network 11 by the link 25. An additional domain representing type Z components that are aggregated by a third router 68 is also shown in FIG. 3.

Similar to a communications network, each of the routers, or aggregators, 21, 23 and 26 shown in FIG. 3 has the capability to receive data in a format or protocol that defines a logical subnet and translate the received data and/or protocol into another logical subnet format or protocol. The router can then transmit the translated data and/or protocol to another destination that is in the other logical subnet format or protocol. This is illustrated in FIG. 6 where the domains are also labeled to represent such logical subnets. Accordingly, any alternate routing path between a source address and a destination address must pass through a translation processing capable of transforming the data in the required fashion. If a particular gateway should fail, normal communications routing mechanisms will restore an application connectivity via an alternate gateway as required to translate data in the desired way.

Figure 7:
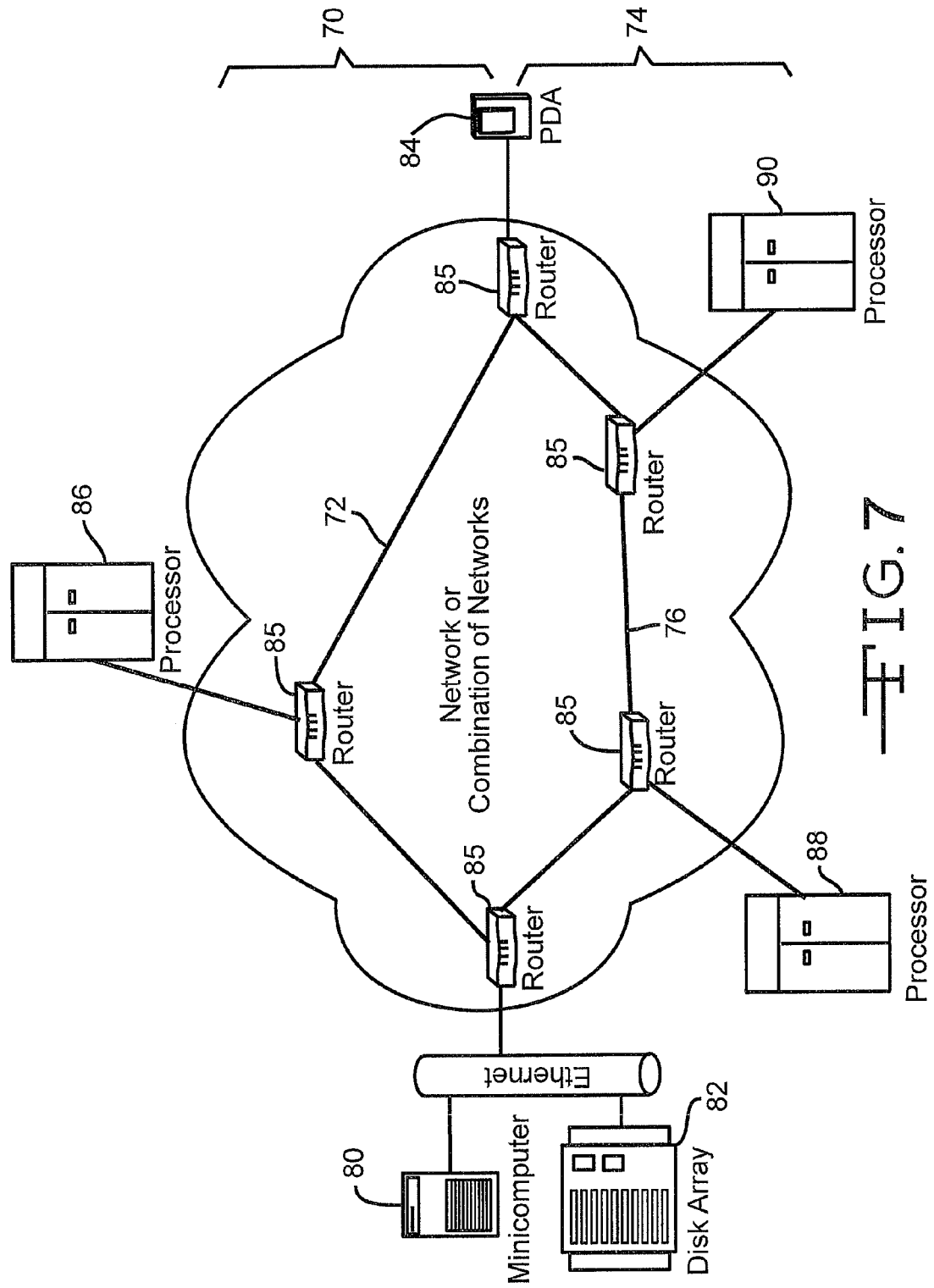
FIG. 7 is another embodiment of the compositional service shown in FIG. 3.

A further illustration of the invention is shown in FIG. 7 where a given composite service composed of multiple component functions is constructed of a first component group 70 that is shown by a first path labeled 72 or a second component group 74 that is shown by a second path labeled 76. Thus, the composite service can be viewed as being a network of components connected by a path. The service may be implemented by either path 72 or path 76, or some fractional combination of each path (not shown) depending upon the characteristic suitability of each path to the business opportunity. For instance, in the example shown, the first path 72 may implement all of an interface service required to connect a given media origin server, illustrated as the mini-computer 80 and a disk array 82 to a PDA device 84 using a collection of communication links, routers 85, and a single server 86 that processes the message by performing various computational tasks, such as, for example, rate adaptation, image scaling, and size/scale transformations. The second path 76 may implement the interface service using a larger collection of communication links, routers 85, and two servers 88 and 90.

Because the compositional service, in its entirety, is viewed by the invention as a network of independent component processes, anything that can traverse and verify the network effectively traverses and verifies the service. So, in order to verify a specific compositional service, one must first determine the domain address information for the "destination" data form/encoding etc. . . . . Then a ping message may be constructed using an address in that destination range. The ping message could be understood and transmitted by both physical routers and the logical routers, or aggregators, without distinction. However, in traversing the physical routers and links the ping message will verify the physical integrity of the connection, and in traversing the logical routers, or aggregators, the ping message will verify the logical integrity of the connection. Each router, which may be either physical or logical, will receive the ping message from a link that it "understands" to come from a connecting domain. If the router is physical, the domain represents a close group of physically connected hosts and routers, and if the router is logical, the domain represents a consistent data form/encoding etc. Based upon the source and destination domain information, the router will look up the correct "port" on which to transmit the data out, with the router look-up occurring on the device's routing table. If the router is a physical device, the "port" will connect to physical links that will "translate" the location of the data. If the router is a logical device, or aggregator, the "port" will connect to component processes that will translate the form/encoding of the data. As is described in the following paragraph, a Ping style of message does not bear any data content, so unless the aggregator introduces information about the components that would be traversed, or tests them in some fashion, the actual data translation processes would not be affected.

Since each of the routers functionality considers data of a given form to be in a given domain, the Ping message that is "routed" to a specific application component is considered to be in a different domain once it is "routed" to that component. The "routing functionality", regardless of what it is combined with or runs on, must transmit the data addressing information to the aggregator representing the output data form domain that the service component is to produce. Whether the routing function is located in the aggregator, a component proxy, or an extension to the component, it must transmit the Ping message to the aggregator representing the output data form domain that the component would produce. For example, if the aggregator represents the "zip form" domain, the data may be routed through a specific decompression process which produces a "GIF" graphic form. However, if the destination domain is a "JPEG" form, the "GIF" domain aggregator must then route the data through a component that processes "GIF" form to "JPEG" form. Note that the destination remains a "JPEG" domain throughout. So, the aggregator in each domain (or other routing functionality mechanism) must pass the data packet header to the aggregator responsible for the next domain using the logical path (port, pipe, stream, etc. . . . ) defined for the current data form (domain). Accordingly, a Ping will travel from aggregator to aggregator tracing one domain conversion to the next until the final data form (domain) is reached. Since there is no actual data to process in a Ping message, the path would be verified, but the conversion would not be exercised. In lieu of exercising the conversion, the routing functionality (presumably the aggregator) could delay the Ping packet by the current expected service time for that conversion process before forwarding.

While the preferred embodiment of the invention does not include a test data set with the Ping message, the invention also contemplates that a test data set could be included with the Ping message. The inclusion of the test data set would further test the conversion processes encountered as the message travels between domains along the service path. However, the processing of the test data set could prove to be difficult in cases where a specific conversion process has to maintain "context" based upon the last data it processed. For example, some data compression schemes retain "context" or "memory" based upon the last data processed, which is then used as a basis to process the next data. If a "context" sensitive conversion is involved, the Ping message cannot transmit "test" data to convert because it will corrupt the conversion context.

If the application network is connected and functional, the ping message will be forwarded through the logical service components to the physical port(s) associated with the physical network connection(s). The ability of the ping message to reach the final destination provides confirmation of the logical completeness and connectivity of the compositional service as a whole. It also may optionally provide confirmation of functionality if the Ping message has test set data to process, or if the Ping message collects performance information from the aggregators traversed in the path. As in conventional communication networks, the final destination would be responsive to receipt of the ping message to generate a reply message to the sender. The invention contemplates that the sender would observe the elapsed time, or delay, between sending the ping and receiving the reply message. The delay can then be used to determine the loading and latency induced by the various components of the compositional system.

The virtue of a mechanism like an application ping is that it can traverse the entire path that the media must follow. If, for instance, there were a performance or load problem within the communications subsystem of one of the servers 86, 88 or 90 illustrated in FIG. 7, standard communications monitoring would probably not show the problem since the communications links would have no problem handling the communications demands produced by the service. Likewise the application would probably not show any problem since it may run on an entirely separate processor from the communications subsystem of the server. So, traditional monitoring capabilities would very likely not show a problem with the service even though it would not perform well from the perspective of the user of the PDA 84. The application ping mechanism would provide instrumentation capability of the entire path since the "ping" must pass through the communications subsystem on the server as well as the processor blade that the application resides in.

An example of the use of the application ping mechanism may employ a service monitor to schedule an application ping to periodically check each node of a service path. The end to end ping would accurately reflect the experience of the service user. Intermediate node pings would help to isolate and diagnose service response problems by noting where delays were encountered or, in bad cases, what the last reachable node was.

Figure 8:
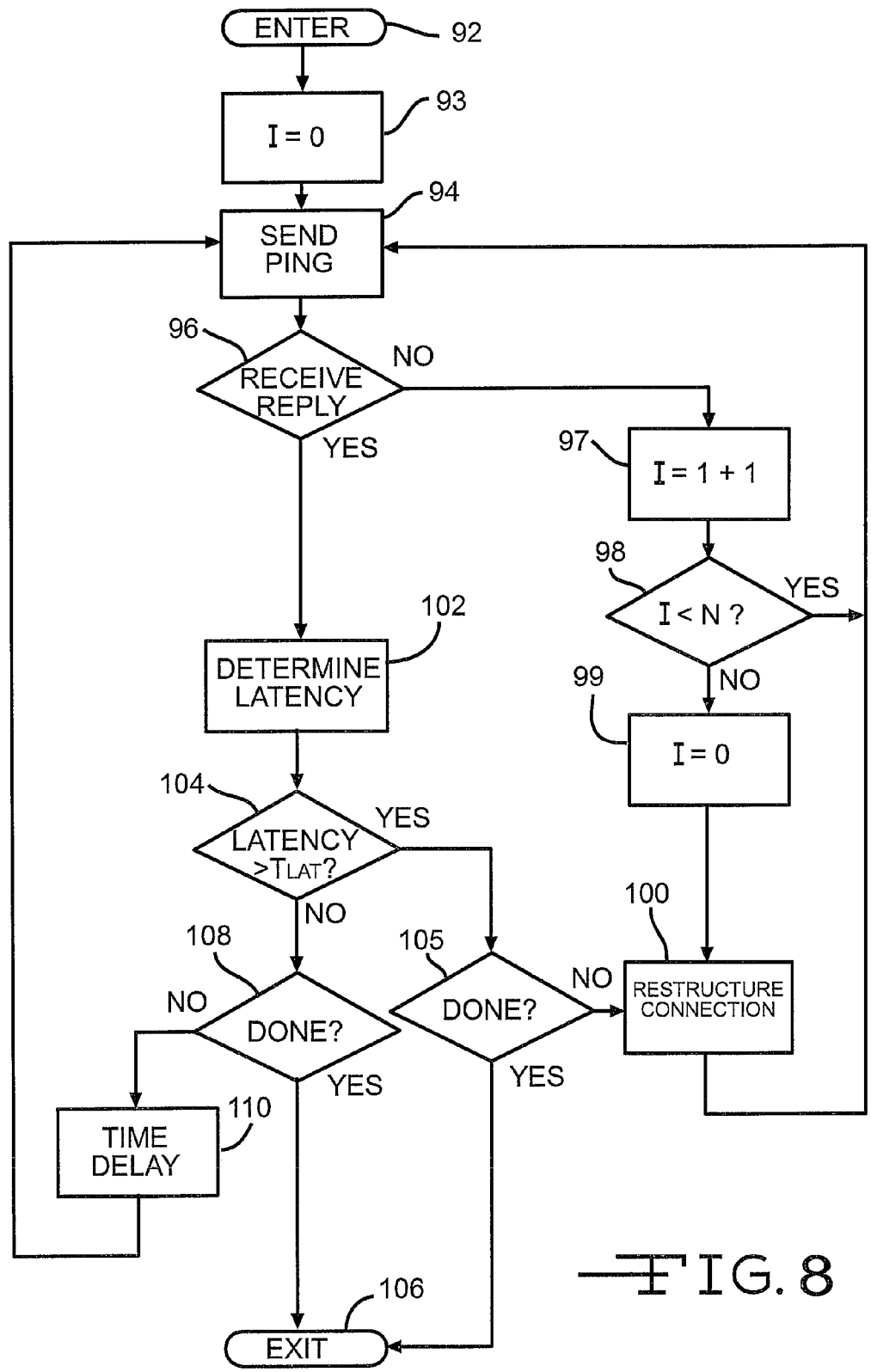
FIG. 8 is a flowchart illustrating testing the functionality of the compositional service.

An algorithm for the operation of the invention is illustrated by the flow chart shown in FIG. 8. The flow chart is entered through block 92 when a message is initiated and sent over the service path. The algorithm begins by initially setting an index, I, to zero in functional block 93 and then proceeds to functional block 94 where an initial ping is sent over the system. The algorithm next advances to decision block 96 and checks to determine whether a response ping or echo was returned by the receiver at the other end of the service path, such as the PDA 84 in FIG. 7. If no reply is received within a predetermined response time period, the algorithm transfers to functional block 97 where the index I, which was initially set at zero, is indexed by one. The algorithm then advances to decision block 98 where the index I is compared to the maximum number of pings sent, N, before the connection should be restructured. If I is less than N, the algorithm returns to functional block 94 and another ping is sent. If the index I is equal to, or greater than N, in decision block 98, the algorithm transfers to functional block 99, where the index I is reset to zero. The algorithm then continues to functional block 100 where the connection is then restructured to an alternate service path or the current path is modified. The re-sending of the ping before reconfiguring as described above is an example of a "best effort" application, such as one that would be offered at no extra cost to subscribers. The quality of service can be increased by decreasing the maximum number of pings N that would be sent before reconfiguring the connection. The invention does contemplate that N can be set at zero. It is likely that a single lost or timed-out reply may not be sufficient to consider the path down. However, depending upon the application, the failure of such a single ping message could be taken as an indication of a composite application failure. Returning to functional block 100, the invention contemplates that restructuring is accomplished by returning to functional block 44 in FIG. 4 to de-allocate the elements being currently used. However, instead of forwarding a release message, the algorithm would instead return to functional block 35 to generate a new reservation request. The algorithm would then proceed to reserve capacity and allocate virtual processing elements, as described above. Once functional block 42 is reached in FIG. 4 and the connection is transmitted to the requester, the algorithm returns to functional block 94 in FIG. 8 and sends another ping to test the restructured service path. Alternately, if applicable, the sequence illustrated in FIG. 5 could be used to implement the restructuring of the path.

If, in decision block 96, a response ping is received by the sender within the predetermined response time period, the algorithm transfers to decision block 102 where the total elapsed time for the ping to travel to the receiver and the response ping, or echo, to return, which is known as the path latency, is determined. The algorithm then advances to decision block 104 where the latency is compared to a maximum latency threshold time, $T_L$, in decision block 104. The total elapsed time for the transmission and return is also an indication of path loading. If the total elapsed time is greater than the threshold $T_L$, the algorithm again transfers to decision block 105 where the system is checked to determine whether the transmission is complete. If the transmission is not complete, the algorithm transfers to functional block 100 where the service path is restructured to an alternate path or the current path is modified, as described above. Following restructuring, the algorithm again returns to functional block 94 and sends another ping to test the restructured service path.

If, in decision block 105, the transmission is complete, nothing further is needed and the algorithm transfers to exit block 106 where the algorithm is terminated.

If, in decision block 104, the latency is less than or equal to the expected latency threshold, the algorithm advances to decision block 108 where the system is checked to determine whether the transmission is complete. If the transmission is complete, the algorithm transfers to exit block 106 and the algorithm is terminated.

If, in decision block 108, the transmission is not complete, the algorithm transfers to functional block 110 and waits for a time delay. The invention also contemplates that the duration of the delay in functional block 110 may be adjustable; however, this configuration feature is optional. Upon completion of the time delay, the algorithm returns to functional block 94 and another ping is sent over the service path to retest the connection. Thus, the invention contemplates periodically re-testing the connection to assure that the connection remains operable and continues to meet specific service criteria throughout the transmission of information over the service path.

Figure 9:
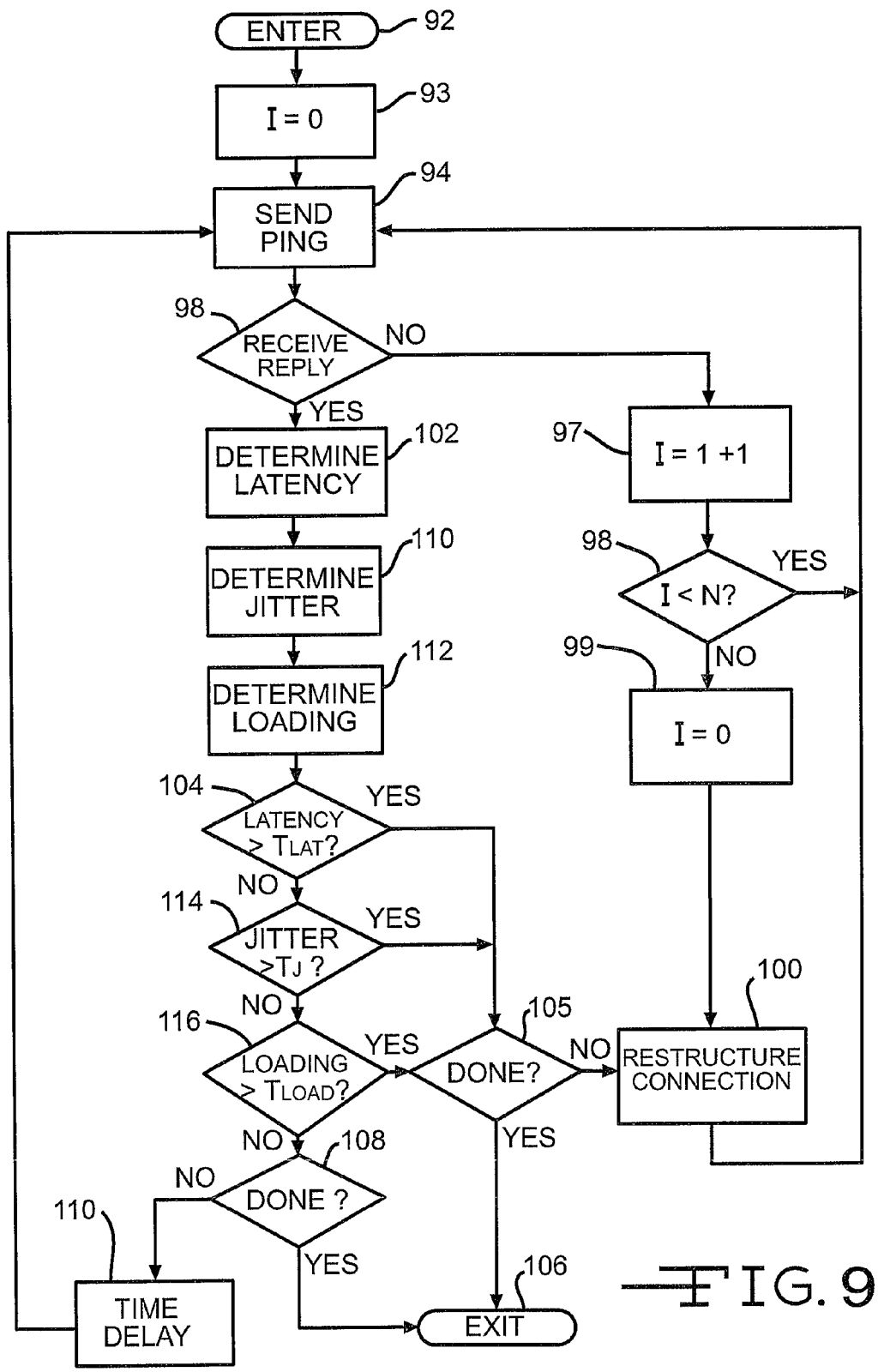
FIG. 9 is a flow chart illustrating an alternate embodiment of the functionality test shown in FIG. 8.

It will be appreciated that the algorithm shown in FIG. 8 is intended to be exemplary and that the invention also may be practiced with algorithms that differ from the one shown in the figure. Also, additional service criteria could be added to the algorithm. For example, as illustrated in FIG. 9, where blocks that are the same as shown in FIG. 8 have the same numerical identifiers, between functional block 102 and decision block 104, the jitter and loading of the service path is determined in functional blocks 110 and 112, respectively. Between decision blocks 104 and 108, the jitter of the service path is compared to a jitter threshold, $T_J$, in decision block 114 and the loading is compared to a loading threshold, $T_{LOAD}$, in decision block 116. The service path is reconfigured if either the jitter or loading exceeds the corresponding threshold. Similarly, the system scalability also can be compared to a corresponding scalability threshold (not shown) and the service path reconfigured as needed. While determination of latency, jitter and loading are shown in FIG. 9, it will be appreciated that the invention also may be practiced with any one of latency, jitter and loading being determined and compared to a corresponding threshold, as been illustrated in FIG. 8 for latency. Similarly, any combination of latency, jitter, scalability and loading may be used to confirm the connectivity and functionality of the service path.

Furthermore, the invention also contemplates that, while total path delay is compared to a delay threshold in decision block 104, individual node delays along the service path also could be measured and compared to a service node delay threshold (not shown). The service path would then be reconfigured to exclude any node where the node delay exceeds the threshold.

The inventor believes that the foregoing invention provides a simple, functional mechanism for implementing service resource allocation which merges transport resource allocation with processing resource allocation and storage resource allocation. Transport management methods and tools such as Tivoli® NetView® from IBM Corporation and traffic management protocols such as RSVP-TE are leveraged to provide compositional service assembly and management while optimizing resource utilization.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of managing computer processing resources connected within a network, said method comprising the steps of:
   (a) interconnecting a plurality of physical processing components within said network for providing a plurality of virtual processing elements that are accessible by respective network traffic paths to perform a respective data processing operation on user-supplied data;
   (b) representing a pool of said virtual processing elements using a resource aggregator, each virtual processing element having a capacity allocable according to a respective communication transfer rate based on a sustainable data flow to complete respective data processing transactions on user-supplied data;
   (c) receiving a reservation request for utilizing specified processing resources;
   (d) exclusively reserving at least one virtual processing element with said resource aggregator for providing capacity to satisfy said reservation request in response to said respective communication transfer rate;
   (e) allocating use of a respective network traffic path to service said reservation request in response to said identified virtual processing element;
   (f) sending a first test message through the interconnected plurality of physical processing elements;
   (g) sending a reply message to the sender through the interconnected plurality of physical processing elements in response to receipt of the first test message to confirm connectivity and functionality; with message transmission beginning only after the reply message is received over the allocated network path within a predetermined time period that begins with the sending of the first test message;
   (h) sending a second test message upon not receiving a reply message to the first test message within the predetermined time period, with message transmission beginning only after a reply message is received over the allocated network traffic path in response to receipt of the second test message within a predetermined time period that begins with the sending of the second test message;
   (i) upon not receiving a reply message to the second test message, sending further test messages with message transmission beginning only after a reply message is received over the allocated network traffic path in response to one of the further test messages;
   (j) upon having sent a predetermined number of test messages without receiving a reply message, reallocating the network traffic path; and
   (k) sending a test message to at least one intermediate node in the network traffic path to determine a nodal delay time associated with the intermediate node and comparing said nodal delay time to a nodal delay time threshold and further, upon determining that the nodal delay time is unsatisfactory, reallocating the network traffic path.

2. The method of claim 1 wherein the pool of virtual processing elements in step (b) includes logical routers and further wherein the test and reply messages sent in steps (f) through (i) verify the logical integrity of the network traffic path.

3. The method of claim 2 wherein the pool of virtual processing elements in step (b) also includes physical routers and further wherein the test and reply messages sent in steps (f) through (i) verify both the logical integrity and the physical integrity of the network traffic path.

4. The method of claim 1 wherein the pool of virtual processing elements in step (b) includes physical routers and further wherein the test and reply messages sent in steps (f) through (i) verify the physical integrity of the network traffic path.

5. The method of claim 1 wherein steps (f) through (j) also include determining the total time required by the test and reply messages to transit the network, the total time being an indication of the loading and latency of the network.

6. The method of claim 1 wherein said network is comprised of an Internet protocol (IP) network and wherein said step of allocating use of a respective network traffic path is comprised of sending an IP message in a bandwidth reservation protocol.

7. The method of claim 1 wherein said network is comprised of an Internet protocol (IP) network and wherein said network traffic paths are comprised of label-switched paths.

8. The method of claim 1 further including periodically repeating steps (f) through (j) to assure continued satisfactory communication.

9. The method of claim 1 further including periodically repeating steps (f) through (j) to assure continued satisfactory communication.

10. The method of claim 1 further including reallocating the network traffic path upon determining in steps (f) through (j) that degradation of service exceeds set parameters.

11. The method of claim 1 further including reallocating the network traffic path upon determining in steps (f) through (j) that network connectivity and functionality are unsatisfactory.

12. The method of claim 11 wherein step (k) includes computing the latency for network path and comparing said latency to a latency threshold and further, upon determining that the network path latency is unsatisfactory, reallocating the network traffic path.

13. The method of claim 11 wherein step (k) includes computing the jitter for network path and comparing the jitter to a jitter threshold and further, upon determining that the network path jitter is unsatisfactory, reallocating the network traffic path.

14. The method of claim 12 wherein step (k) also includes computing the jitter for network path and comparing the jitter to a jitter threshold and further, upon determining that the network path jitter is unsatisfactory, reallocating the network traffic path.

15. The method of claim 11 wherein step (k) also includes computing a loading factor for network path and comparing the loading factor to a loading factor threshold and further, upon determining that the network path loading factor is unsatisfactory, reallocating the network traffic path.

16. The method of claim 13 wherein step (k) also includes computing a loading factor for the network path and comparing the loading factor to a loading factor threshold and further, upon determining that the network path loading factor is unsatisfactory, reallocating the network traffic path.

17. A method of forming a compositional service within a network employing a plurality of physical processing components, said method comprising the steps of:
   a plurality of physical processing components advertising to an aggregator their respective virtual processing components according to a plurality of component types for performing respective data processing operations on user-supplied data and advertising respective capacities of said virtual processing components, wherein said virtual processing components are addressable within said network as respective virtual network elements to perform said respective data processing operations when receiving said user-supplied data;
   said aggregator constructing a plurality of service resource sets from said virtual processing components according to a service type, each service resource set comprised of a combination of said virtual network elements;
   said aggregator receiving a reservation request from a remote user for utilizing resources according to said service type;
   said aggregator allocating a selected service resource set for fulfilling said reservation request;
   said aggregator identifying said selected service resource set to said remote user; and
   said aggregator processing a test message from said remote user to confirm connectivity and functionality of said selected service resource set, with message transmission beginning only after said test message from said remote user is received within a predetermined time period, said aggregator further sending additional test messages upon not receiving a test message from said remote user within the predetermined time period, with message transmission beginning only after a reply message is received over the allocated network traffic path in response to one of said additional test messages sent from said aggregator, said aggregator also sending a test message to at least one intermediate node in the network traffic path to determine a nodal delay time associated with the intermediate node and comparing said nodal delay time to a nodal delay time threshold and, upon determining that the nodal delay time is unsatisfactory, reallocating the network traffic path.

18. An apparatus for providing a data processing service comprising:
   a network including a plurality of transport links;
   a plurality of physical processing components connected within said network for advertising a plurality of virtual processing elements that are accessible by respective network traffic paths to perform respective data processing operations on user-supplied data, each virtual processing element having a capacity allocable according to a respective communication transfer rate based on a sustainable data flow to complete respective data processing transactions on said user-supplied data;
   a resource aggregator connected within said network for representing a pool of said advertised virtual processing elements, receiving a reservation request for utilizing specified processing resources, exclusively reserving at least one virtual processing element for providing capacity to satisfy said reservation request in response to said respective communication transfer rate, allocating use of a respective network traffic path to service said reservation request in response to said identified virtual processing element, and processing a test message to confirm connectivity and functionality of said allocated network traffic path, said test message causing a reply message to the sender being generated upon the test message reaching the destination and with message transmission beginning only after the reply message is received within a predetermined time period, said aggregator further sending additional test messages upon not receiving a reply message to the first test message within the predetermined time period, with message transmission beginning only after a reply message is received over the allocated network traffic path in response to one of said additional test messages within a predetermined time period, said aggregator also sending a test message to at least one intermediate node in the network traffic path to determine a nodal delay time associated with the intermediate node and comparing said nodal delay time to a nodal delay time threshold and, upon determining that the nodal delay time is unsatisfactory, reallocating the network traffic path.

19. An apparatus for providing a compositional data processing service comprising:
   a network including a plurality of transport links;
   a plurality of physical processing components connected within said network for advertising respective virtual processing components according to a plurality of component types for performing respective data processing operations and advertising respective capacities of said virtual processing components, wherein said virtual processing components are addressable within said network as respective virtual network elements to perform said respective data processing operations when receiving said user-supplied data; and
   an aggregator for 1) constructing a plurality of service resource sets from said advertised virtual processing components according to a predetermined service type, wherein each service resource set is comprised of a combination of said virtual network elements for performing processing operations required for said predetermined service type, 2) receiving a reservation request from a remote user for utilizing resources according to said predetermined service type, 3) allocating a selected service resource set for fulfilling said reservation request, 4) identifying said selected service resource set to said remote user, 5) processing a test message to confirm connectivity and functionality of said selected service resource set, with message transmission beginning only after said test message from said remote user is received within a predetermined time period, 6) said aggregator further sending additional test messages upon not receiving a test message from said remote user within the predetermined time period, with message transmission beginning only after a reply message is received over the allocated network traffic path in response to one of said additional test messages sent from said aggregator and 7) said aggregator also sending a test message to at least one intermediate node in the network traffic path to determine a nodal delay time associated with the intermediate node and comparing said nodal delay time to a nodal delay time threshold and, upon determining that the nodal delay time is unsatisfactory, reallocating the network traffic path.

* * * * *